PLURAL EMITTER SEMICONDUCTIVE STORAGE DEVICE

Filed Dec. 29, 1965 2 Sheets-Sheet 1

INVENTOR
THOMAS W. HART JR.
BY Richard J. Donahue
AGENT

PLURAL EMITTER SEMICONDUCTIVE STORAGE DEVICE

Filed Dec. 29, 1965 2 Sheets-Sheet 2

INVENTOR
THOMAS W. HART JR.

United States Patent Office 3,487,376
Patented Dec. 30, 1969

3,487,376
PLURAL EMITTER SEMICONDUCTIVE STORAGE DEVICE

Thomas W. Hart, Jr., Watertown, Mass., assignor to Honeywell Inc., Minneapolis, Minn., a corporation of Delaware Filed Dec. 29, 1965, Ser. No. 517,218
Int. Cl. G11b *9/00*
U.S. Cl. 340—173 5 Claims

ABSTRACT OF THE DISCLOSURE

A memory array having a plurality of storage units formed of cross-coupled multiple-emitter transistors. The plural emitters provide a means for addressing a selected storage unit and for transferring data to and from the selected unit.

The present invention relates in general to data storage apparatus, and in particular to a new and improved integrated circuit memory array.

In data processing systems, it has become increasingly important to provide data storage apparatus which is at once simple, compact, reliable, economical and operable at the high processing speeds now required of such systems. Thus, the computer industry has reinvestigated the possibility of using high-speed transistorized data storage units to form a memory, particularly since a large number of such units, together with associated data writing and sensing circuits, can now be formed on a small wafer of semiconductor material, commonly called an integrated circuit chip.

Thus far, such integrated circuit memory arrays have included storage units of conventional flip-flop design, consisting of paired three-element transistors whose base and collector leads are regeneratively cross-connected for bistable operation and whose emitters are returned to a fixed reference potential. While such storage units perform adequately by themselves, considerable problems arise in attempting to interconnect the storage units within the array for addressing, writing and sensing purposes. As the number of storage units is increased, the cost, complexity and space required for decoding structure which will permit the exclusive selection of a storage unit, by means of concurrently applied addressing signals, becomes prohibitive. Similar problems arise in attempting to route binary data signals to a selected storage unit, and in attempting to sense the binary state of a selected storage unit. Here again, the required gating structure and interconnecting leads severely limit the storage capacity of the memory array and degrade its overall performance and reliability.

It is therefore an object of the present invention to provide an improved memory array which is not subject to the foregoing disadvantages.

It is a further object of the present invention to provide an improved data storage unit suitable for use in an integrated circuit memory array.

It is another object of the present invention to provide a transistorized memory array formed on an integrated circuit semiconductor chip and having improved selection circuitry.

The present invention is directed to a memory array which is adapted for use on an integrated circuit chip and includes a number of data storage units, each having a pair of multiple-emitter transistors. The base and collector elements of the transistors are regeneratively cross-connected, as in a conventional flip-flop circuit, for bistable operation. Unlike a conventional flip-flop circuit however, the multiple-emitter elements are not returned to fixed reference potentials, but serve as a means for uniquely selecting a desired storage unit without resorting to additional gating or decoding structure. In addition, the plural emitters provide a means for applying write pulses to a selected storage unit and, if desired, for sensing the state of a selected storage unit.

In prior art transistorized memory arrays, the binary state of a selected storage unit was determined by coupling a first or a second voltage level derived from a point therein to the input lead of a common sense circuit. It was therefore necessary to await the charging or discharging of the parasitic capacity of the sense circuit input lead to detect the binary state of the selected storage unit. In the smaller memory arrays, the capacity of the sense circuit input lead may be small, and the time required to charge this capacitance acceptable. However, as the number of storage units in the array is increased, the length of the sensing lead, and consequently its capacitance increases considerably. As a consequence, the time required to charge or discharge the sensing lead capacitance markedly limits the operating speed of the memory.

In a preferred embodiment of the present invention, the binary state of a selected storage unit is determined by sensing the presence or absence of current, rather than voltage, through an emitter of one of the paired transistors. A sense circuit is provided which detects the presence or absence of emitter current while maintaining a constant voltage level on its input lead for the detected current and non-current conditions. Since it is not necessary to await the charging or discharging of the sense lead capacitance to determine the binary state of a selected storage unit, the operational speed of the memory array is greatly increased.

It is therefore an additional object of the present invention to provide an integrated circuit memory array having a new and improved current sensing circuit.

For a better understanding of the invention, reference should be had to the accompanying drawings in which.

Figure 1:
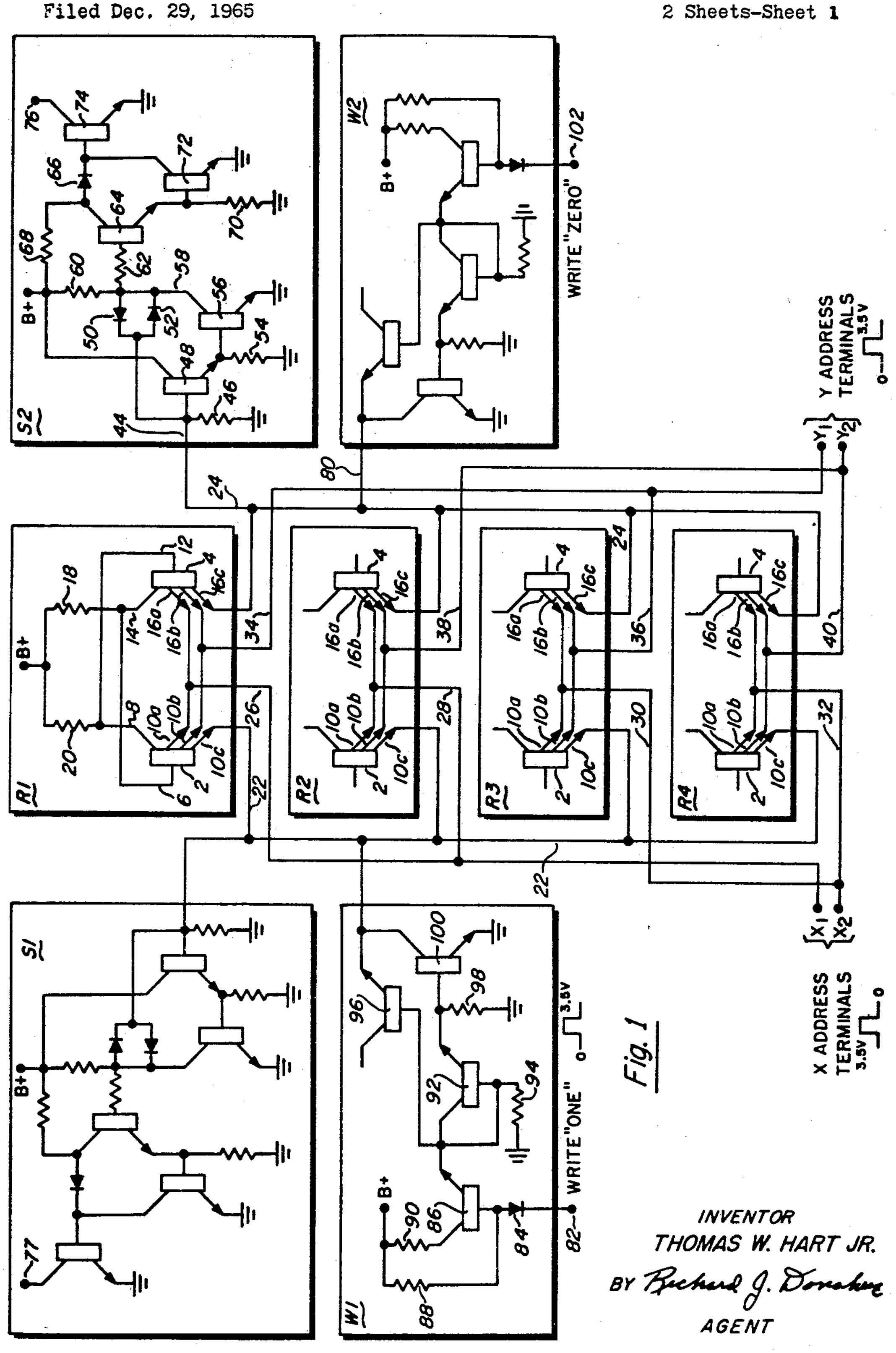
FIGURE 1 illustrates a preferred embodiment of the present invention.

Referring now to FIGURE 1 of the drawings, there is shown a preferred embodiment of the memory array of the present invention which is most advantageously formed on a monolithic semiconductor substrate chip. The array includes four data storage units R1–R4 arranged in a two-coordinate X–Y addressing matrix, a pair of write circuits W1 and W2, and a pair of sense circuits S1 and S2.

Since the storage units R1–R4 are identical in structure and in operation, only the storage unit R1 is shown here in its entirety. The storage unit R1 includes a pair of transistors 2 and 4 of the NPN conductivity type. The transistor 2 has a base 6, a collector 8 and three separate emitters 10*a*, 10*b* and 10*c*. Similarly, the transistor 4 has a base 12, a collector 14, and three separate emitters 16*a*, 16*b* and 16*c*. Such multiple-emitter transistors are well-known and are readily fabricated in integrated circuit form. The base and collectors of transistors 2 and 4 are regeneratively cross-connected, as in a conventional bistable flip-flop circuit having single-emitter transistors. Thus, the base 6 of transistor 2 is connected to the collector 14 of transistor 4 and is coupled to a positive reference potential terminal B+ by means of the collector resistor 18. Similarly, the base 12 of transistor 4 is connected to the collector 8 of transistor 2 and is coupled to the aforementioned B+ terminal by means of collector resistor 20.

Each of the storage units R1–R4 has its emitter **10*c* of transistor 2 connected externally to a common data transfer line 22 and its emitter 16*c* of transistor 4 connected externally to a common data transfer line 24. The emitters 10*a* and 16*a* are connected together within each storage unit, as are the emitters 10*b* and 16*b*. The combined emitters, 10*a*, 16*a* and 10*b*, 16*b* of each storage unit are connected externally to different combinations of the X and Y coordinate address terminals. Thus, the emitters 10*a*, 16*a* of the storage units R1 and R2 are connected to the address terminal $X_1$ by means of the leads 26 and 28 respectively. The emitters 10*a*, 16*a* of the storage units R3 and R4 are connected to the address terminal $X_2$ by means of the leads 30 and 32 respectively. The emitter 10*b*, 16*b* of the storage units R1 and R3 are connected to the address terminal $Y_1$ by means of the leads 34 and 36 respectively, while the emitters 10*b*, 16*b* of the storage units R2 and R4 are connected to the address terminal $Y_2$ by means of the leads 38 and 40** respectively.

It will be evident that the number of storage units within the memory can be increased if the number of X and Y coordinate address terminals are accordingly increased, to provide a unique combination of X and Y addressing signals for each storage unit. A memory having nine storage units, for example, would require three X and three Y coordinate address terminals.

A pair of sense circuits S1 and S2 are connected to the data transfer lines 22 and 24 by way of their input leads 42 and 44 respectively. Since the sense circuits are identical in structure and in operation, only the sense circuit S2 is described in detail. The sense circuit S2 has its input lead 44 connected to the data transfer line 24 and to one lead of a resistor 46, to the base of a transistor 48, as well as to the cathode of a diode 50 and to the anode of a diode 52. The other lead of resistor 46 is connected to ground while the collector of transistor 48 is connected to a positive reference voltage terminal B+. The emitter of transistor 48 is coupled to ground by the emitter resistor 54 and is connected to the base of a transistor 56, the latter having its emitter connected to ground. The collector 58 of transistor 56 joins the cathode of diode 52, the anode of diode 50, one lead of a collector resistor 60 and one lead of the resistor 62.

The other lead of resistor 60 is returned to the B+ terminal while the other lead of resistor 62 is connected to the base of a transistor 64. The collector of transistor 64 is connected to the anode of a diode 66 and is coupled to the B+ terminal by the collector resistor 68. The emitter of transistor 64 is coupled to ground by the emitter resistor 70 and is connected to the base of a transistor 72, the latter having its emitter connected to ground. The cathode of diode 66 is connected to the collector of transistor 72 and to the base of a transistor switch 74, the latter having its emitter connected to ground and its collector connected to the sense circuit S2 output terminal 76.

A pair of identical write circuits W1 and W2 have their output leads 78 and 80 connected to the data transfer lines 22 and 24 respectively. The write circuit W1 has its Write "One" input terminal 82 connected to the cathode of a diode 84, the latter having its anode connected to the base of a transistor 86 and to one lead of a resistor 88. The other lead of resistor 88 is connected to a positive reference voltage terminal B+. The transistor 86 has its collector coupled to the B+ terminal by way of the collector resistor 90 and its emitter connected to the base of a transistor 92 which, in turn, is coupled to ground by the resistor 94. The base and collector elements of transistor 92 are jointly connected to the base of a transistor 96, the latter having its emitter connected to the write circuit W1 output lead 78. The emitter of transistor 92 is coupled to ground by the emitter resistor 98 and is connected to the base of a transistor 100. The collector of transistor 100 is connected to the write circuit W1 output lead 78, while the emitter of transistor 100 is connected to ground. The write circuit W2 which is identical in construction to the write circuit W1, is adapted to receive a Write "Zero" signal at its analogous input terminal 102 and couples an output signal on its output lead 80 to the data transfer line 24.

In order to best describe the operation of the memory array shown in FIGURE 1, it will be initially assumed that each of the bistable storage units R1–R4 has been previously switched to its binary "zero" state. As previously mentioned, each storage unit contains a pair of transistors 2 and 4 whose base and collector leads are cross-coupled, as in a conventional flip-flop circuit having single-emitter transistors, whereby an externally applied pulse will initiate a regenerative switching action to cause one of the transistors to assume a stable nonconductive condition and the other transistor a stable conductive condition. In the present memory array, the binary "zero" state of a storage unit is arbitrarily defined as that state in which the transistor 4 is rendered conductive and the transistor 2 is rendered nonconductive. Conversely, the binary "one" state of a storage unit is defined as that state in which the transistor 2 is conductive and the transistor 4 is nonconductive.

Prior to the selection of a storage unit for purposes of sensing its present binary "zero" state, or for establishing a binary "one" state within the unit, each of the X and Y coordinate address terminals $X_1$, $X_2$, $Y_1$, $Y_2$ has a ground level signal applied thereto. Thus, in each storage unit, there exist two possible current paths to ground for the transistor 4, each capable of sustaining the preestablished binary "zero" state within its storage unit. For the storage unit R1, for example, there exists a first current path from the B+ terminal, through the collector resistor 18 and the collector-emitter junction **14–16*a* to the presently grounded address terminal $X_1$. A second current path is provided from the B+ terminal through the collector resistor 18, the collector-emitter junction 14–16*b* to the presently grounded address terminal $Y_1$. In each of the remaining storage units R2–R4, there exists a similar pair of current-sustaining paths to ground for the transistor 4 via its associated X and Y address terminals. Since the emitters 10*a* and 10*b* of transistor 2 are connected to the emitters 16*a* and 16*b* respectively of transistor 4 within each storage unit, a pair of current paths will also exist for the collector-emitter junctions 8–10*a* and 8–10*b* of transistor 2** in order to sustain an unselected storage unit in its binary "one" state.

In a practical embodiment of the present invention, each of the data transfer lines 22 and 24, and consequently the emitters **10*c* and 16*c* of each storage unit may have a potential of approximately 1.5 volts applied thereto from the sense circuits S1 and S2 respectively. Briefly, this voltage is formed within each sense circuit by the cumulative value of the voltages, designated $V_{be}$ herein, across the base-emitter junctions of transistors 48 and 56. A detailed explanation of the operation of the sense circuit S2, and the formation of this 1.5 volt level therein, is provided below. As long as there is a ground signal applied to either the X or Y coordinate address terminals of a storage unit, its base-emitter junction, 6–10*c* of transistor 2 and 12–16*c* of transistor 4, will be reverse-biased by the 1.5 volt levels to effectively disconnect the storage unit from the data transfer lines 22 and 24**.

It will now be assumed that it is desired to sense the binary state of the storage unit R1. To do so, a pair of positive-going pulses, which may have an amplitude of approximately 3.5 volts, are concurrently applied to the $X_1$ and $Y_1$ address terminals. Current will continue to flow through the collector-emitter junctions **14–16*a* or 14–16*b* to ground via the address terminals $X_1$, $Y_1$ until such time as the positive-going address pulses exceed the 1.5 volt level established on the emitter 16*c* of transistor 4. At this time, the base-emitter junction 12–16*c* will be forward-biased, and the base-emitter junctions 12–16*a* and 12–16*b* reverse-biased, whereby the current through the collector 14 will be diverted from the emitters 16*a*** and 16*b* to the emitter 16*c* and thence to the data transfer line 24. It is this current which now flows into the input lead 44 of the sense circuit S2 which operates upon the sense circuit S2 components to establish a first output signal therefrom indicative of the sensing of the binary "zero" state of the selected storage unit R1.

Let it now be assumed that it is desired to switch the storage unit R1 from the binary "zero" to the binary "one" state. Having selected the storage unit R1 by means of positive pulses concurrently applied to the address terminals $X_1$ and $Y_1$, a positive-going pulse of approximately 3.5 volts amplitude is applied to the Write "One" input terminal 82 of the write circuit W1. This signal causes the current which normally flows from the B+ terminal through resistor 88 and through the diode 84 to ground, to be diverted to the base of transistor 86 to render the latter conductive. The base current path for transistor 86 includes the B+ source, resistor 88 and the base-emitter junction of transistor 86 and the emitter resistor 94 connected to ground. The positive-going signal now formed across the emitter resistor 94 is coupled through the diode-connected transistor 92 to the base of transistor 100 to cause the latter to conduct. The conduction threshold voltage $V_{be}$ formed across the base-emitter junctions of the diode-connected transistor 92, the diode-connected transistor 96 and the transistor 100, serve to prevent the transistor 100 from achieving a saturated condition. By limiting the collector voltage of the conducting transistor 100 to a value slightly above ground potential, the turnoff speed of the transistor 100 is greatly increased. In addition, a margin of safety is provided which ensures that the unselected storage units are not inadvertently switched in state by noise pulses occurring on their grounded address leads.

The voltage established across the collector of transistor 100, and coupled via the output lead 78 to the data transfer line 22, although slightly above ground potential, is nevertheless much lower than the 1.5 volt level normally maintained across the data transfer line 24 by the sense circuit S2. Therefore, the base-emitter junction 6–10*c* will be forward-biased to initiate current flow through transistor 2. The regenerative switching action which follows results in the sustained conduction of current through the collector-emitter junction 8–10*c* of transistor 2, and the termination of current through the collector-emitter junction 14–16*c* of transistor 4. The newly established binary "one" state within the storage unit R1 will persist after the termination of the positive-going write pulse applied to the write circuit W1 when the data transfer line 22 again assumes its 1.5 volt level.

It will be apparent that if it were now desired to re-establish the binary "zero" state within the storage unit R1, this may be done by applying a positive-going write pulse to the Write "Zero" input terminal 102 of write circuit W2 to initiate the complementary regenerative switching action within the storage unit R1; further, the remaining storage units R2–R4 may be similarly switched in state upon the concurrent application of selection pulses to their associated X and Y address terminals.

Having established the binary "one" state within the selected storage unit R1, the current which now flows through the collector-emitter junction 8–10*c* of transistor 2 is coupled via the data transfer line 22 into the input lead 42 of the sense circuit S1. The current which flows into the sense circuit S1 provides a first output signal therefrom indicative of the sensing of the binary "one" state of the selected storage unit.

When the selected storage unit R1 exists in its binary "one" state, there is no longer a current flowing through the data transfer line 24 to the sense circuit S2. The absence of current on the data transfer line 24 causes the sense circuit S2 to provide a second output signal which can also be used to indicate the sensing of the binary "one" state of the selected storage unit. Either the sense circuit S1 or S2, therefore, is sufficient by itself to indicate by means of its pair of output signal levels, the binary status of a selected storage unit. The provision of two such sensing circuits, however, provides complementary output signals from the memory array which signals are often required for the operation of associated computer apparatus. If only one sense circuit is used, it is necessary to provide at least those components within the excluded sense circuit, or their equivalents, to maintain the data transfer line at the aforementioned 1.5 volt level.

The operation of the sense circuit S2 will now be described in detail, first, for the case when the selected storage unit exists in the binary "one" state and provides no current to its input lead 44 via the data transfer lead 24, and then for the case when the selected storage unit exists in its binary "zero" state wherein the collector-emitter current through the transistor 4 of the selected storage unit flows into the input lead 44 via the data transfer lead 24. When the selected storage unit exists in its binary "one" state, a current path is formed within the sense circuit which includes the B+ terminal, resistor 60, diode 50, the base-emitter junction of transistor 48, and the base-emitter junction of transistor 56 to ground. The transistors 48 and 56 have their base-emitter junctions serially connected to ground and each has a base-emitter conduction threshold voltage $V_{be}$ thereacross of approximately 0.75 volt. The input lead 44, therefore, is clamped to a voltage of approximately 1.5 volts. This voltage is coupled, via the lead 44, to the data transfer line 24 to establish the aforementioned 1.5 volt level thereon.

At this time, the voltage at the collector 58 of transistor 56 is the sum of the voltage $V_d$ across the conducting diode 50, and the base-emitter voltages $V_{be}$ of the transistors 48 and 56. If the forward conducting threshold voltage $V_d$ across diode 50 approximates 0.75 volt, then the voltage at the collector 58 is $V_d+2V_{be}$ volts or 2.25 volts. The diode 52 which has 1.5 volts applied at its anode and 2.25 volts at its cathode, will be reversed-biased and will have no current flow therethrough. The 2.25 volt potential on the collector 58 of transistor 56 is coupled to the base of transistor 64, via the base resistor 62 and is sufficiently positive to exceed the combined 1.5 volt $V_{be}$ potential required to render the transistors 64 and 72 conductive.

When transistors 64 and 72 conduct, a current path is provided from the B+ source, through resistor 68, diode 66 and the collector-emitter junction of transistor 72 to ground. The grounding of the collector of transistor 72 in turn establishes a ground potential at the base of the transistor switch 74 to render the latter nonconductive. The open circuit condition established across the collector-emitter junction of transistor switch 74, and coupled to the output terminal 76, can be alternatively used to indicate that the selected storage unit exists in its binary "one" state.

When the selected storage unit exists in its binary "zero" state, the current through transistor 4 will be coupled via its emitter 16*c* and the data transfer line 24, to the input lead 44 of the sense circuit S2. This additional current flows into the base-emitter junction of transistor 48 and thence through the base-emitter junction of transistor 56 to ground. The voltage at the collector 58 of transistor 56 goes negative from 2.25 volts to a level approximating the base-emitter voltage $V_{be}$ of transistor 56, or a value approximating 0.75 volt. The diode 52, having a conduction threshold voltage $V_d$ of 0.75 volt now conducts to route the additional current on the input lead 44 directly through the collector-emitter junction of transistor 56 to ensure that the input lead 44 remains at the previously established 1.5 volt level. The voltage at the collector 58 of transistor 56, which now decreases from 2,25 volts to 0.75 volt, is coupled to the series connected base-emitter junctions of transistors 64 and 72 but is no longer sufficiently positive to exceed their combined base-emitter conduction threshold level $2V_{be}$ volts, or 1.50 volts. Transistor 72 becomes nonconductive and a current path is established from the B+ source, through resistor 68, diode 66 and the base-emitter junction of transistor switch 74. Transistor 74 conducts and the output terminal of sense circuit S2 is clamped to approximately ground potential. A ground level at the output terminal 76 of sense circuit S2 indicates that the selected storage unit exists in its binary "zero" state.

During the aforementioned operative conditions of the sense circuit S2, a pair of complementary output signal levels will be obtained from the sense circuit S1. The complementary output signals appearing at the output terminal 77 of sense circuit S1, can be alternatively used to indicate the binary status of the selected storage unit.

Figures 2, 3:
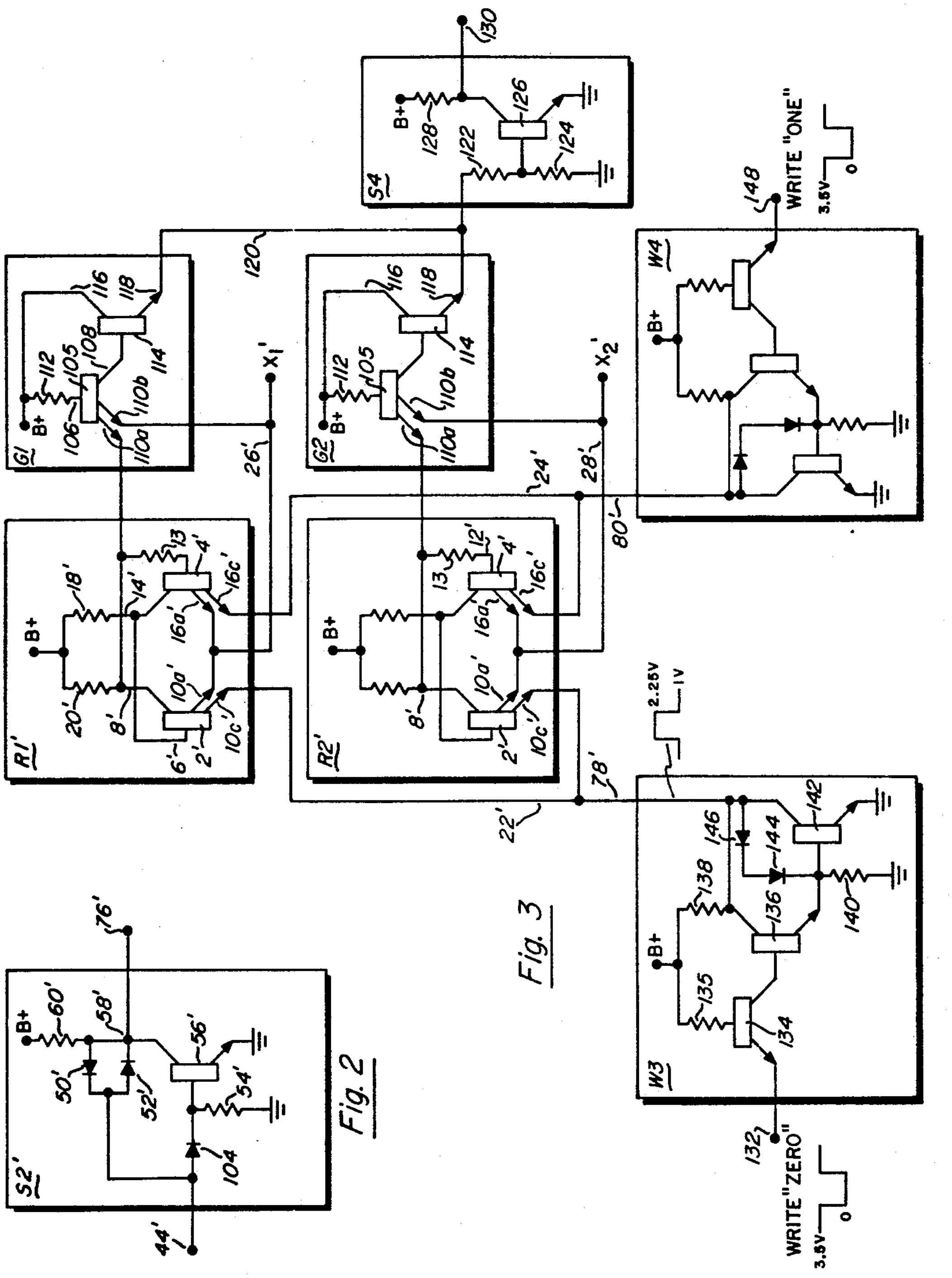
FIGURE 2 illustrates a modified version of the sense circuit S2 of FIGURE 1.
FIGURE 3 illustrates another embodiment of the present invention.

FIGURE 2 illustrates a modified version S2′ of the sense circuit S2, which is useful in applications where the high gain characteristic of the sense circuit S2 is not required, and where the impedance of the load attached to the output terminal 76 is of a sufficiently high value, so as not to adversely effect the sense circuit operation. Components analogous to those found in the sense circuit S2 bear the same reference numerals, but are primed. In the sense circuit S2′, the transistor 48 is replaced by a diode 104 having its anode connected to the sense circuit input lead 44′ and its cathode connected to the base of transistor 56′. The diode 104 is selected to have a conduction voltage threshold, designated $V_d$ herein, which approximates the base-emitter voltage drop $V_{be}$ of the transistor 48 in sense circuit S2. The voltage established upon the sense circuit input lead 44′ now becomes the sum of the voltage $V_d$ across the diode 104 and the voltage $V_{be}$ across the base-emitter junction of transistor 56′, or 1.5 volts. The operation of transistor 56′ and its related passive components is the same as that described for the sense circuit S2. The transistors 64, 72 and 76, as well as their related passive components, have been omitted in the sense circuit S2′. The 2.25 volt and 0.75 volt signals established at the collector 58′ are directly coupled to the output terminal 76′ to indicate the binary state of a sensed storage unit.

It will be apparent that the storage units R1-R4 of FIGURE 1 can be modified within the scope of the present invention to include paired-transistors, each having more than three emitters. Such a modification of the storage units is particularly advantageous if the memory array has a large number of storage units, i.e. a high storage capacity. Each additional set of paired emitters will permit an additional level of decoding, whereby it becomes possible to select a storage unit within the array with a minimum number of externally applied address signals.

If the memory array includes but a few storage units, it may be economically advantageous to modify the storage units to include two-emitter transistors It will now be necessary to provide a separate address signal for each storage unit. Nevertheless, the provision of a second emitter in each of the paired transistors still makes it possible to apply write signals directly and simultaneously to each storage unit, without resorting to additional write circuit gating structure. Only the storage unit which is selected by an address signal will be switched in state by the applied write signals.

An array of this kind, suitable for low storage capacity memory arrays, is illustrated in FIGURE 3, and includes circuitry which permits sensing of the collector voltage of a selected storage unit, if so desired. In addition, write circuits are provided which change the conductive state of a selected storage unit by initiating a decrease in the current flowing through the normally conducting transistor, rather than by initiating a current through the normally non-conducting transistor, as is the case in the embodiment of FIGURE 1. The interconnecting leads, units and components in FIGURE 3 which are analogous to those shown in FIGURE 1 bear the same reference numerals, but are primed. The storage units R1′ and R2′ differ from the storage units R1 and R2 of FIGURE 1 in that the transistors 2′ and 4′ have but two emitters, **10*a*′, 10*c*′ and 16*a*′, 16*c*′ respectively. Further, a resistor 13 is included in the feedback lead between the collector 8′ and base 12′. The emitters 10*c*′ and 16*c*′ of each storage unit are connected externally, via the data transfer leads 22′ and 24′ to the write circuits W3 and W4 respectively. The combined emitters 10*a*′ and 16*a*′** of the storage units R1′ and R2′ are connected to the associated address terminal $X_1'$ and $X_2'$ respectively. A storage unit is selected upon application of a positive-going signal to its associated address terminal.

The storage units R1′ and R2′ have associated therewith the gating circuits G1 and G2 respectively, which are identical in structure and in operation. Each gating circuit includes a transistor 105 having a base 106, a collector 108 and a pair of separate emitters **110*a* and 110*b*. The emitter 110*a* is connected to the collector 8′ of transistor 2′ in its associated storage unit, while the emitter 110*b* is connected to the realted address terminal. The base of transistor 105 is coupled to a positve reference potential B+ via the resistor 112 while its collector 108 is connected to the base of a transistor 114, the latter having its collector connected to the aforementioned B+ terminal. The emitter 118 of transistor 114 in each gating circuit is coupled to a common sense lead 120**.

A sense circuit S4 is provided which includes the resistors 122 and 124 connected in series between the sense input lead 120 and ground. The junction of resistors 122 and 124 is coupled to the base of a transistor 126 having its emitter connected to ground and its collector coupled to the B+ terminal via resistor 128, and connected to the sense circuit output terminal 130.

The write circuits W3 and W4 have their output leads 78′ and 80′ connected to the data transfer lines 22′ and 24′ respectively. Since the write circuits W3 and W4 are identical in structure and operation, only the write circuit W3 is described here in detail. The write circuit W3 includes a write "zero" input terminal 132 which is coupled to the emitter of a transistor 134. The base of transistor 134 is coupled to a B+ terminal by way of the base resistor 135, while the collector of transistor 134 is directly connected to the base of a transistor 136. The collector of transistor 136 is coupled to the aforementioned B+ terminal by means of the resistor 138 and is connected to the collector of a transistor 142, while its emitter is coupled to ground by the emitter resistor 140, and is connected to the base of transistor 142 and the cathode of the series-connected diodes 144 and 146. The emitter of transistor 142 is connected to ground. The collector of transistor 142 and the free anode lead of the diode combination 144–146 are connected to the aforementioned output lead 78′.

The writec ircuits W3 and W4 normally have a 3.5 volt level applied to their respective input leads 132 and 148 respectively. The voltage thus established on the collector of transistor 136 is sufficiently positive to cause the conduction of transistor 142. Thus, the collector of transistor 142, and consequently the data transfer lines 22′ and 24′ are normally maintained at a voltage approximating 1.0 volt.

If a selected storage unit, such as the storage unit R1′ exists in its binary "one" state, and it is desired to switch the storage unit to its binary "zero" state, a ground level signal is applied to the write "zero" input terminal 132. This signal causes the increased conduction of transistor 134 and establishes a lower voltage at the base of transistor 136 which causes the latter to become nonconductive. The current now flowing through the data transfer line 22′ is routed to ground via the diodes 146, 144 and the base-emitter junction of transistor 142. Therefore, the voltage established at the collector of transistor 142, and consequently upon the data transfer line 22′, approximates 2.25 volts, or the combined voltage drops across the diodes 146, 144 and the base-emitter voltage drop across transistor 142.

At this time, the 2.25 volts established across the data transfer line 22' is greater than the 1 volt level normally maintained on the data transfer line 24'. The decrease in the current flowing through the collector-emitter junction 8'–10c' of transistor 2' initiates a switching action whereby the transistor 2' becomes nonconductive and the transistor 4' becomes conductive. This results in establishing the binary "zero" state in the selected storage unit R1'. It will be apparent that the non-selected storage unit R2' will not be effected by the 2.25 volt and 1.0 volt levels formed on the data transfer lines by the write circuits, since its emitters 10a' and 16a' are held at ground potential by the ground level signal applied to the address selection terminal $X_2'$.

Considering now the operation of the sense circuitry, prior to the selection of the storage unit R1' a conductive path will exist for the transistor 105 of gate circuit G1 which includes the B+ terminal, resistor 112, and the base-emitter junction 106–110b to ground via the grounded address terminal $X_1'$. When a positive 3.5 volt signal is applied to the address terminal $X_1'$ and the selected storage unit R1 exists in its binary "zero" state, the positive voltage appearing on its collector 8' will render the transistor 105 nonconductive to provide an energizing signal via the B+ terminal, resistor 112 and the base-collector junction 106–108 to the base of transistor 114. The positive voltage now coupled to the sense lead 120 will cause the sense circuit transistor 126 to conduct, to establish a ground potential on its output lead 130 indicative of the binary "zero" state of the selected storage unit.

If, on the other hand, the selected storage unit R1' exists in its binary "one" state, the transistor 105 will remain conductive due to the lower voltage coupled thereto from the collector 8' of transistor 2'. The lower voltage now coupled to the sense circuit S4 via the lead 120 will not permit conduction of transistor 126. Its output lead will approach B+ potential to indicate the binary "one" state of the selected storage unit. A similar set of output signal conditions will be formed upon the selection of the storage unit R2'.

The present invention has been described and illustrated with reference to a practical embodiment having specific operating parameters, such as specific voltage levels, waveforms etc. Such parameters are not to be construed as limiting the scope of the invention. Further, while the circuitry which forms the subject matter of the invention is preferably formed on a monolithic semiconductor substrate, it is clearly possible to construct different circuit portions on a number of individual semiconductor chips. Nor is the invention limited to integrated circuit construction but may find application in more conventional circuit arrangements. Also, the storage units and sense circuits may find separate utility in an electronic environment other than a memory array.

While in accordance with the provisions of the statutes there have been illustrated and described the best forms of the invention known, it will be apparent to those skilled in the art that further modifications may be made in the apparatus described without departing from the spirit of the invention, as set forth in the appended claims and, in some cases, certain features of the invention may be used to advantage without corresponding use of other features.

Having now described the invention, what is claimed as new and novel and for which it is desired to secure Letters Patent is:

1. A memory array comprising a plurality of individually selectable storage units, each storage unit comprising paired first and second transistors each including a single base element, a single collector element and a plurality of emitter elements, the transistors of each storage unit having their single base and collector elements cross-coupled to form a bistable circuit characterized by complementary transistor current values for the respective stable states of said circuit, at least one separate address selection line corresponding to each of said storage units, one emitter element of each of said paired transistors in each storage unit being jointly coupled to the corresponding address selection line, first and second data transfer lines coupled to another emitter element of said first and second transistors respectively in each storage unit of said array, means for selectively energizing said address selection lines to condition chosen ones of said storage units to assume a desired stable state, and means for selectively applying signals to said data transfer lines to establish said desired stable state in said chosen storage unit and further including means for sensing a pre-established stable state of a selected one of said storage units and further including means for biasing said collector elements to a first reference level, and means for normally maintaining said address selection lines at a second reference level to sustain said pre-established stable state in each of said storage units wherein said sensing means is coupled to the collector element of at least one of said paired transistors wherein said sensing means includes a sense circuit, separate gating means corresponding to each of said storage units, each of said gating means having first and second inputs coupled to said last recited collector element and to said address selection line respectively of the corresponding storage unit, each of said gating means further having an output coupled to said sense circuit.

2. A memory array comprising a plurality of individually selectable storage units, each storage unit comprising paired first and second transistors each including a single base element, a single collector element and a plurality of emitter elements, the transistors of each storage unit having their single base and collector elements cross-coupled to form a bistable circuit characterised by complementary transistor current values for the respective stable states of said circuit, at least one separate address selection line corresponding to each of said storage units, one emitter element of each of said paired transistors in each storage unit being jointly coupled to the corresponding address selection line, first and second data transfer lines coupled to another emitter element of said first and second transistors respectively in each storage unit of said array, means for selectively energizing said address selection lines to condition chosen ones of said storage units to assume a desired stable state, and means for selectively applying signals to said data transfer lines to establish said desired stable state in said chosen storage unit, and further including means for sensing a pre-established stable state of a selected one of said storage units and further including means for biasing said collector elements to a first reference level, and means for normally maintaining said address selection lines at a second reference level to sustain said pre-established stable state in each of said storage units and wherein said sensing means includes at least one sense circuit coupled to one of said data transfer lines, said sense circuit comprising: a third transistor including a base, a collector and an emitter, means for biasing said last-recited emitter to a further reference level, means for resistively coupling a reference voltage to said last-recited collector, an asymetrically conductive device adapted to have a conduction threshold voltage formed thereacross, said device being connected between said data transfer line and the base of said third transistor, said device being poled in a direction to pass forward current to said third transistor, a pair of oppositely poled diode means connected between said data transfer line and the collector of said third transistor and means for deriving an output signal from the collector of said third transistor.

3. The apparatus of claim 2 wherein said asymmetrically conductive device includes a diode having its anode coupled to said data transfer line and its cathode coupled to the base of said third transistor.

4. The apparatus of claim 2 wherein said asymmetrically conductive device includes a fourth transistor having its base coupled to said data transfer line, and its emitter coupled to the base of said third transistor, and means for applying said reference voltage to the collector of said fourth transistor.

5. A current sensing circuit comprising an input terminal, a bias voltage terminal, first and second transistors each including a base, an emitter and a collector, said first transistor having its base coupled to said input terminal and its collector coupled to said biasing voltage terminal, said first transistor having its emitter coupled to the base of said second transistor, said second transistor having its emitter coupled to ground, first and second diodes each having an anode and a cathode, said first diode having its cathode coupled to said input terminal and its anode coupled to the collector of said second transistor, said second diode having its anode coupled to said input terminal and its cathode coupled to the collector of said second transistor, means for resistively coupling the collector of said second transistor to said bias voltage terminal, an output terminal, and means for coupling the collector of said second transistor to said output terminal.

References Cited

UNITED STATES PATENTS

| | | | |
|---|---|---|---|
| 3,218,613 | 11/1965 | Gribble | 340—173 |
| 3,423,737 | 1/1969 | Harper | 340—173 |
| 3,229,119 | 1/1966 | Bohn. | |

OTHER REFERENCES

British Pat. No. 958,242, dated May 21, 1964, 6 pp. Spec., 3 Shts. Dwg.

TERRELL W. FEARS, Primary Examiner

U.S. Cl. X.R.

307—238, 239, 291, 299